UNITED STATES PATENT OFFICE.

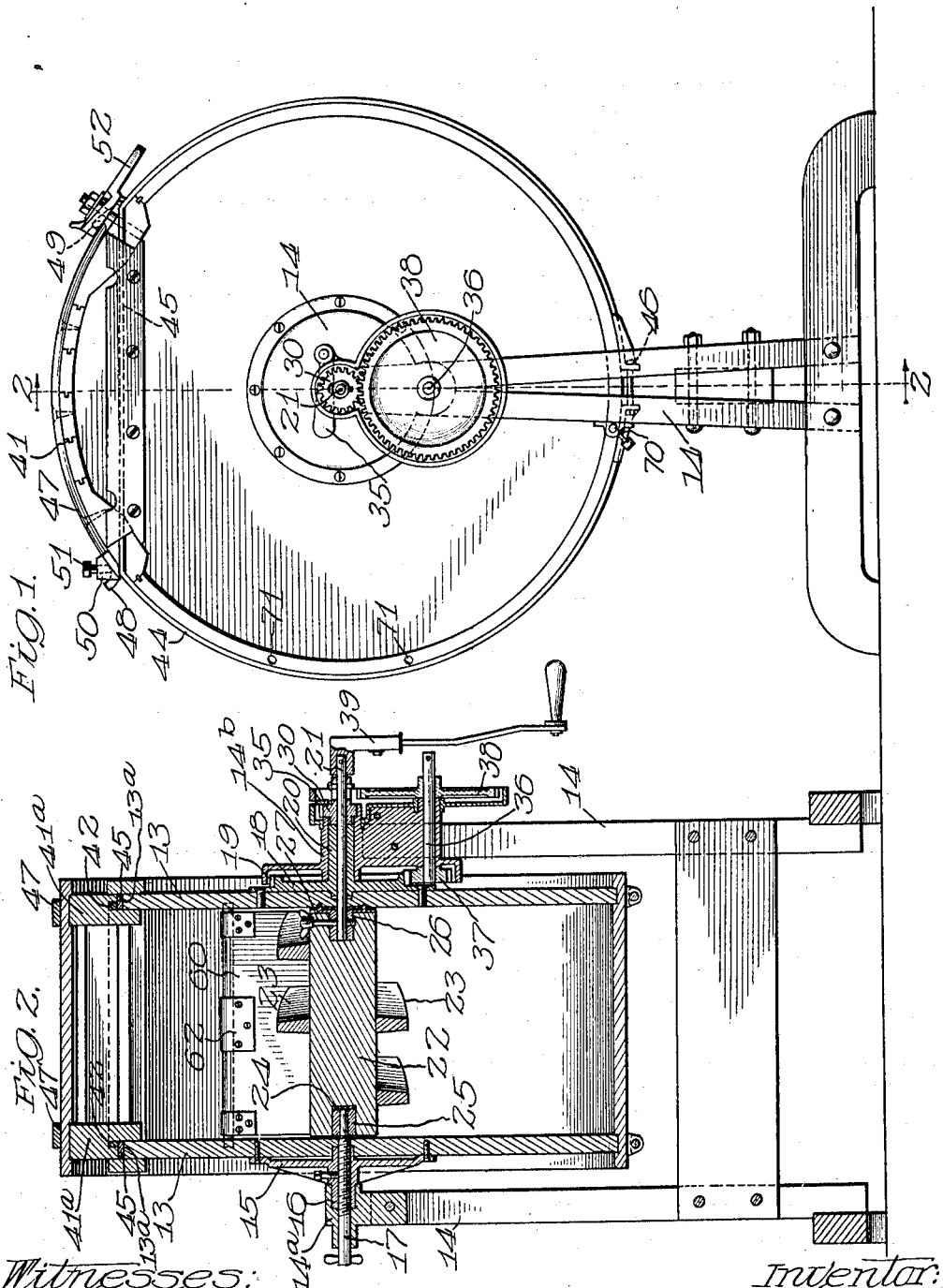

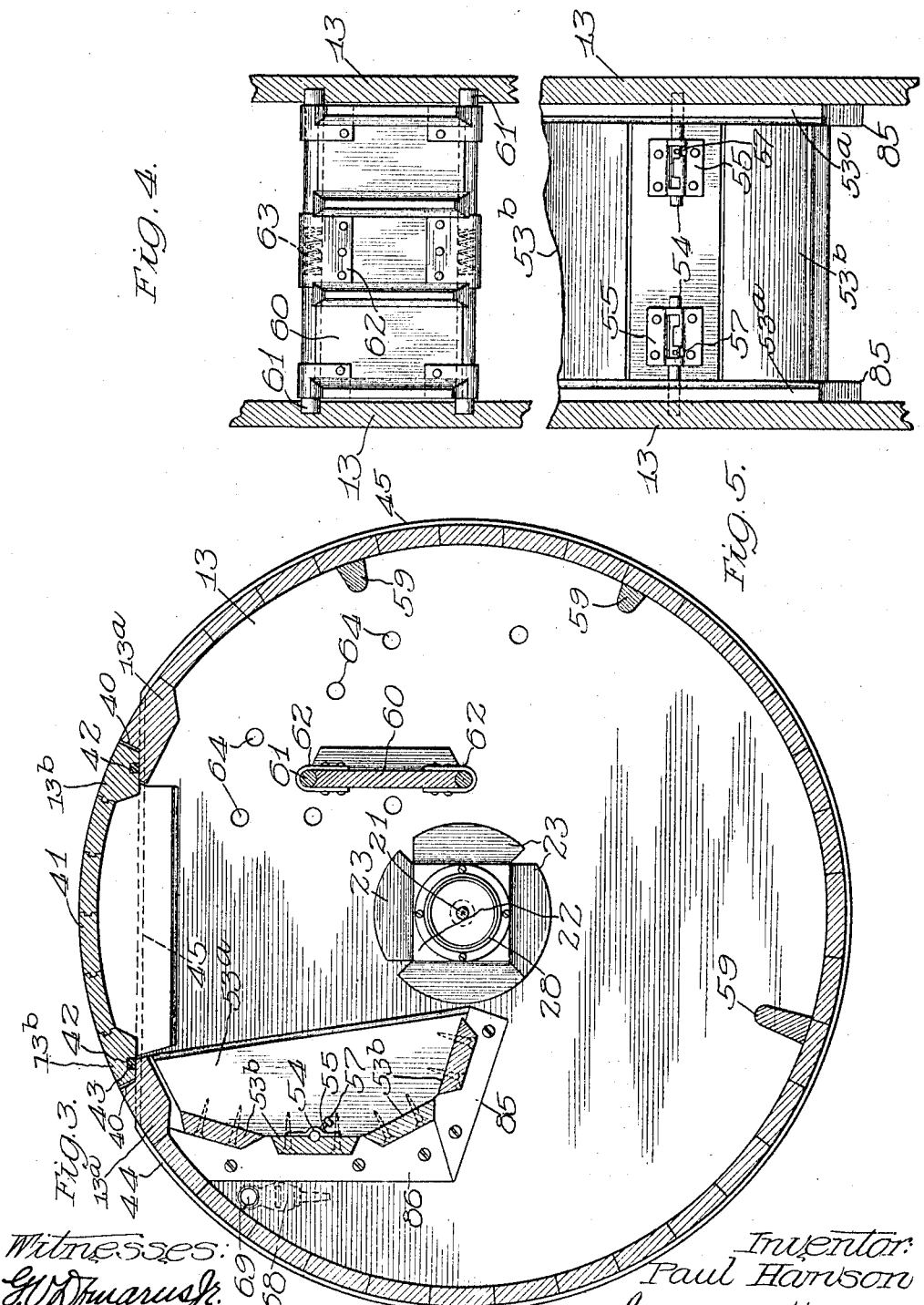

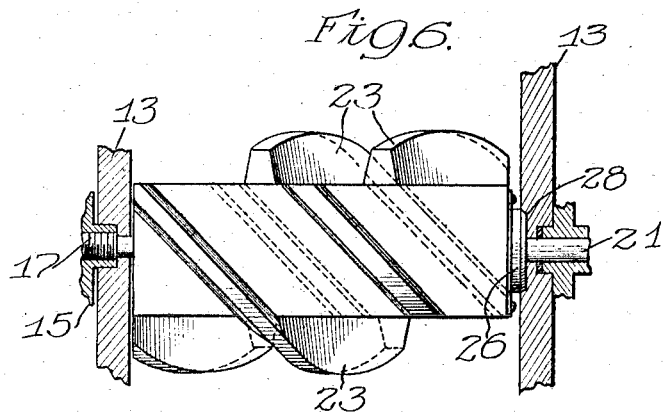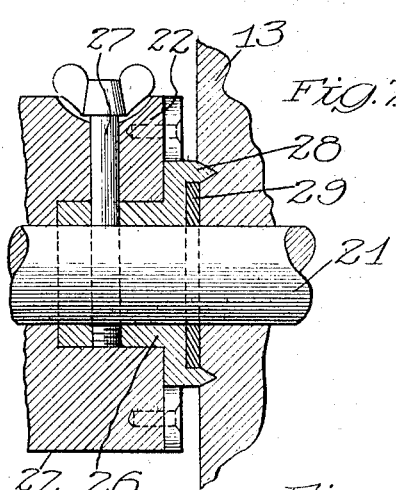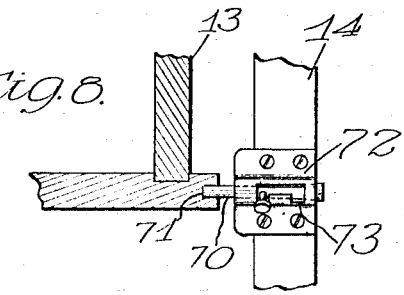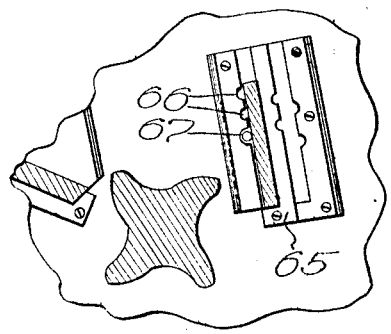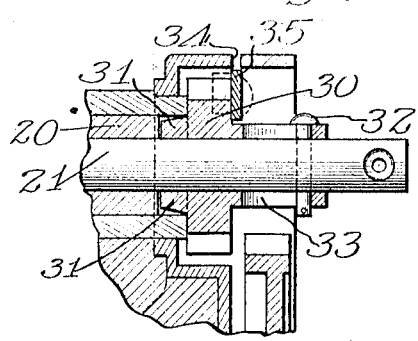

PAUL HANSON, OF WILD HORSE, COLORADO.

BUTTER-MAKING MACHINE.

1,053,594.  Specification of Letters Patent.  Patented Feb. 18, 1913.

Application filed September 8, 1911. Serial No. 648,345.

*To all whom it may concern:*

Be it known that I, PAUL HANSON, a citizen of the United States, residing at Wild Horse, in the county of Cheyenne and State of Colorado, have invented certain new and useful Improvements in Butter-Making Machines, of which the following is a specification.

This invention relates to a combined churn and butter worker more particularly designated and described as a butter making machine, and the principal object of the invention is to provide a simple, durable and cheap device of the class described, which will be effective and efficient in operation.

For the attainment of these ends and the accomplishment of other new and useful objects, as will appear, this invention consists in the features of novelty in the construction, combination and arrangement of the several parts generally shown in the accompanying drawings and described in the specification, but more particularly pointed out in the appended claims.

In the drawings Figure 1 is an end view of a device constructed in accordance with the principles of my invention; Fig. 2 is a sectional view of the same on the line 2—2 of Fig. 1; Fig. 3 is a cross sectional view intermediate of the ends of the drum; Fig. 4 is a detail view of the butter working shelf; Fig. 5 is a detail view of the cradle locking device; Fig. 6 is a detail view showing the butter working roller; Fig. 7 is a detail view of the packing device for the roller shaft; Fig. 8 is a detail view of the drum locking device; Fig. 9 is a detail view of the knuckle clutch device; Fig. 10 is a view of a modification of the butter working shelf holder.

In a machine or device of this class it is desirable to provide means not only for separating the butter fats from the fluid placed in the machine, but also to provide means for working the butter after the butter fats have been extracted. To accomplish this the machine must be provided with means to discharge fluid therefrom, and to work the butter while it is in the proper condition. Means for convenient and ready access must be had to the interior of the machine.

The present invention contemplates a machine in which these results are attained and in which the butter working roller may be operated at different speeds in separating the fats and in working the butter.

Referring now more particularly to the drawings and in the present exemplification of the invention, a drum 13 is provided with bearing standards or supports 14. The drum is provided at one end with a spider 15, having a central extending sleeve 16 to support the drum in a bearing $14^a$ at the top of one of the standards 14. Extending through this bearing $14^a$ and threaded in the spider 15 is a shaft 17. At the other end of the drum is secured a bearing member 18 having the gear teeth 19 and an extending sleeve portion 20, which is supported in a bearing member $14^b$ which is of irregular shape and forms a housing for the gearing being itself supported on standard 14. A shaft 21 is freely rotatable within the sleeve portion 20 extending within the drum and projecting beyond the bearing support $14^b$.

Within the drum a butter working roller 22, provided with vanes 23 is pivotally mounted at its ends by means of the shafts 17 and 21. The shaft 17 bears against a disk 24, seated in an opening in the end of the roller and suitably held in position by the wood block 25, which forms a bearing for the roller. A casting 26 is secured at the other end of the roller 22 and receives the end of shaft 21. The shaft 21 is secured to the roller 22 by means of a thumb screw 27, which may be inserted from the face of the roller. This casting 26 is formed with an extending annular ring 28, having a sharpened edge concentric with the shaft 21 (see also Fig. 7), which is adapted to cut into the wood of the inside of the drum. Within the ring shaped edge and surrounding the shaft there is positioned packing material 29, and when the shaft 17 is turned relatively to the drum in the spider 15, the roller 22 will be pressed toward the other end of the drum so that the sharpened annular ring 28 will enter the wood at that end, forming with the packing 29 a fluid tight joint about the shaft 21, which prevents the escape of fluid from this end.

At the outer end of the shaft 21 there is positioned a knuckle clutch pinion 30, shown more clearly by Fig. 9. This pinion is formed with engaging lugs 31 which are adapted to connect the clutch pinion with the end of the sleeve portion 20, of main gear 18 which is provided with openings to receive the projections of the clutch pinion 30. This pinion 30 is secured to the shaft by means of a pin or bolt 32, which extends through a slotted opening 33 in the clutch pinion 30, so that the pinion is permitted to move longitudinally along the shaft into and out of engagement with the sleeve portion 20. Positioned above the clutch pinion 30 and movable in a slot 34 is a latch 35. This latch is adapted to lock the pinion in connection with the sleeve portion 20 or free of the sleeve.

Spaced from the shaft 21 is a counter shaft 36 to which are secured the gear wheels 37 and 38. The former of these gear wheels meshes with the gear teeth 19 of the end casting 18 and the gear 38 is adapted to mesh with the pinion 30 when the latter is locked free of its connection with the sleeve portion 20. From this construction it is evident that when the clutch pinion 30 is in engagement with the sleeve portion 20 the shaft 21 will be locked directly in connection with the sleeve portion 20 and the casting 18. In other words, the butter working roller 22 and the drum 13 will be rotated in unison. When the clutch pinion 30 is released from its connection with the sleeve portion 20 and meshes with the gear 38, the crank 39 is secured to shaft 36 instead of shaft 21 so that shaft 36 becomes the driving shaft and a relatively increased speed is imparted to butter working roller 22 while a relatively decreased speed is imparted to the drum through small gear 37 on driving shaft 36 meshing with driving gear 18 on the drum.

The drum is provided with a door opening 40, which is formed so as to provide a substantially plane jamb by removing or omitting a segment of the drum for the full length thereof. A door 41 for the opening has a frame 41$^a$ which substantially fits the jamb of the door, and is provided in its under surface with a groove 42, in which packing material 43 is disposed to make a tight connection with the door jamb. In the preferred construction the door 41 is formed with an outer portion with substantially the same curvature as that of the drum, so that the door in position upon the door opening presents with the drum a smooth exterior surface. At the sides of the door opening and extending around the drum immediately over the drum heads are hoops 44, formed with a flattened portion 45 and adapted to be bound about the drum and adjustably secured in place by means of fastening bolts 46. The peripheries of the heads of the drum 13 are also flattened or have a segment of their circumference cut away as indicated at 13$^a$, Fig. 2 and to correspond with these flattened portions of the drum heads the hoops 44 are flattened as indicated at 45.

In this embodiment of the invention, the door 41, like the remainder of the drum, is shown as made of wood although any suitable material may be used, two thickened end pieces as indicated at 41$^a$ are provided and to these the staves of the door which are similar to the staves of the remainder of the drum are secured by any suitable means as nails or screws not illustrated, the thickened side members 41$^a$ of the door along their under sides are provided with depending flanges extending on the inside of the drum heads and registering closely therewith to form a liquid tight joint. Outside the flange portions are the seats which rest upon the door jamb which is formed by the flattened portion 45 of the hoops 44. To further assist in forming a liquid tight joint between the door and the jamb on the drum, I prefer to provide grooves in the seat portions of the members 41$^a$ of the door and into these grooves insert suitable packing material as cork. In order to further strengthen both door and the jamb on the drum, I prefer to provide thickened staves at the extremities of the door as indicated at 13$^a$, Fig. 3. These thickened staves 13$^a$ are formed with suitable grooves as shown in the sectional views in Fig. 3 to coöperate with the thickened staves 13$^b$ at the extremities of the door in forming a liquid tight joining between the door and the jamb. To further secure a liquid tight fit the thickened staves 13$^b$ on the door are also grooved and strips of cork packing as indicated at 42, inserted therein.

To furnish a means for removably securing the door to the drum, I prefer to provide the door with two curved bars usually of metal, spaced apart and shown in the drawings as extending approximately over the cross pieces of the door 41$^a$, although it is not desired to be limited to this specific construction. Any number of these curved bars 47 may be employed according to the length of the drum. In the present embodiment two of such are shown and they are curved throughout their length to conform with the curved peripheries of the door and at their extremities they are provided with abrupt curved portions 48, 49, the first of which is adapted to be placed beneath a fulcrum member 50, as shown in Fig. 1 which may be of metal or other suitable material and secured to the drum adjacent the door jamb. In order to take up any looseness between the door and the drum to insure a liquid tight joining between the two, I provide an adjustable set screw in the fulcrum member 50 which is adapted to bear upon the curved end 48 of the bar 47. As a further means of securing the door to the drum, I provide suitable adjustable connections at the opposite extremities of the bar 47 adjacent the abruptly curved portions 49. These latter connections consist preferably of pivoted levers 52 which may be secured to the thickened portions adjacent the door jamb. The levers 52 are provided with wedge connections adapted to coöperate with the abruptly curved portions 49 on the door for the purpose of binding the door firmly against the wall of the drum at that side.

Within the drum with one end positioned adjacent one side of the door, and the other end disposed at one end of or adjacent the butter working roller 22, is a cradle 53. This cradle extends longitudinally of the drum, and is composed of two end pieces 53ª to which are secured a plurality of cross connecting members 53ᵇ by screws, as shown, or other suitable means. The cradle 53 is detachable and removable from the interior of the drum, and in order to secure the same in its operative position within the drum I provide end cleats as indicated as 85—86 on each head of the drum, these cleats being secured to the drum heads by screws or other suitable means. Cleats 85—86 are recessed to provide seats for the cross members 53ᵇ of the cradle, and the cradle itself is secured in its operating position within the drum by means of locking bolts 54, which are shown in the form of longitudinally movable bolts, the ends of which may engage in suitable recesses in the drum heads. A detail view of this locking device is shown in Fig. 5, 54 being the locking bolts, 55 the housing for securing them in position on one of the cleats 53ᵇ of the cradle. The bolt 54 is provided with pin 57 used for operating the bolt and moving in a slot in the retaining plates 55. The adjacent walls or heads 13 of the drum are recessed and the pins 54 enter these recesses.

Arranged about the inner surface of the drum are projections or flights 59, which are adapted to agitate and to raise the material within the drum as the latter is rotated.

Disposed within the drum and on the side of the roller 22 opposite the cradle 53 is a shelf 60 against which the butter is worked by the roller 22. In the preferred embodiment of the invention the shelf 60 is constructed in accordance with the detail view shown by Fig. 4, in which the ends of the shelf are supported in the ends of the drum 13 by means of the spring pressed bolts 61, there being a central member 62 with openings through which to receive the ends of the bolts, and a space between the bolts to receive a resilient member 63. This shelf 60 is preferably rotatable about a number of fixed points in the drum and adjustable at any desired angular position. This is evident from an inspection of the openings 64 in the ends of the drum, as shown more clearly in Fig. 3.

A modification of the means for holding the butter working shelf is shown in Fig. 10, in which slotted cleats 65 are secured in the ends of the drum and adapted to receive the shelf slidably in the slots. These cleats are provided with openings 66 in which a slidable bolt 67 is adapted to engage and which are adapted to position the shelf with respect to the roller.

The butter working roller is made movable or adjustable for the reason that it may be desired to make a different quantity of butter in the machine at different times.

The butter working roller, like most of the other parts of the device, which come in contact with the cream and butter, is made of wood, and in the present embodiment it consists primarily of a wooden shaft rectangular in cross sections and having secured to the four sides thereof a plurality of angularly disposed vanes 23, also preferably made of wood. A detail of this roller is shown in Fig. 6, from which it will be seen that the angularly disposed blades are so positioned on the shaft 22 as to deflect materials with which they come in contact. From an inspection of this figure it will be seen that as the butter working roller is rotated continuously in one direction, the butter will be worked longitudinally of the roller in one direction during substantially one-half of the rotation, and in the opposite direction during the other half of the rotation, by means of the vanes 23, thereby insuring that there will be a thorough mixture of the material.

To position the drum with respect to its standards, and to hold it in any desired fixed position, there is provided upon one of the standards a locking bolt 70, (see Fig. 8) which is adapted to engage in openings 71 around the outer edge of the drum. The bolt is movable into and out of engagement with the drum, being held in position by plate 72. A plurality of openings 71, is provided in the drum, which are so disposed that the drum may be locked in any desired or suitable position.

The door opening extends the full length of the drum with the door of a length corresponding thereto, so that the butter working rollers, cradles, and the like, may be easily removed for cleaning, repairing, replacement, and the like.

In operation the cream is placed in the drum and the drum is rotated by means of a hand lever 39, or any desired and suitable mechanical means, the knuckle clutch pinion 30 being in connection with the sleeve portion 20, so that the roller 22 will be rotated in the same direction as the drum. As the drum is rotated the cream is picked up by the cradle 53 and the flights 59, and is thoroughly agitated until the butter fat is separated from the rest of the fluid, the cradle 53 being operative to direct the fluid against the roller 22 to further agitate the cream. After the butter fat is separated from the rest of the fluid the buttermilk is strained off by means of a faucet 68, which is inserted in an opening 69, preferably located beneath the cradle 53 and adjacent the outer edge of the drum. Water of about the same temperature as the butter is then put into the drum, the butter is washed and the water drained off. Salt and butter color are then added as desired, and in the present exemplification of the invention the crank 39 is removed from the shaft 21 and placed on the shaft 36, a knuckle clutch 30 is moved out of engagement with the sleeve portion 20, and is moved into engagement with the gear 38, the pinion being locked in such position by the latch 35. With this driving connection between the shafts the drum 13 will be rotated at a much slower speed than the butter working roller 22, which will cause the butter to be thoroughly mixed by means of the roller when the cradle directs the butter against the roller. The rotation of the roller directs the butter against the butter working shelf 60, which assists in working the butter, and works it down between said shelf and the roller to the bottom. In the revolution of the drum the bars or flights 59 around the inner edge of the shell of the drum will carry the butter around until it again tumbles over toward the bottom, when the cradle will engage and carry it up again and repeat the operation.

It is evident that various changes may be made in the construction, combination and arrangement of the several parts which constitute this invention without departing from the spirit and scope thereof.

What I claim is:

1. A combined churn and butter worker comprising a horizontally pivoted drum, a working roller rotatably journaled therein, and means at one end of the drum to press the roller longitudinally against the opposite end of the drum to effect a fluid tight joint.

2. In a combined churn and butter worker, the combination with a drum of a working roller pivotally mounted therein, a ring having sharp edge secured to one end of the roller and concentric with the mounting, and means at the other end of the roller to press the sharp edge of the ring into the drum at the other end of the drum to form a tight joint, the drum and the roller being rotatable at different speeds.

3. In a combined churn and butter worker, the combination with a drum, of a butter working roller pivotally mounted therein, a spider secured to the drum with a central threaded opening, a shaft threaded into said opening adapted to press against one end of the roller and to form a bearing pivot for the roller and the drum, a ring with a sharp edge secured to the other end of the roller, the sharp edge being adapted to be pressed into the drum by the shaft at the other end, and means to rotate the drum and the roller about their pivotal mountings at the same and different speeds.

4. In a device of the class described, the combination with a rotatable drum and a working roller rotatable therein, of bearing standards therefor, a spider secured to one end of the drum having a threaded central opening, a shaft adjustable in said opening, extending outwardly through the bearing standard to provide a bearing shaft for the drum, and extending inwardly to form a pivot pin upon which the roller may turn, a washer positioned in the roller against which the said shaft may bear, a hand wheel on the shaft to turn the shaft in the threaded opening and to press against the said washer, a shaft at the other end of the drum extending inwardly to form a pivot for the roller, a thumbscrew, extending through the shaft from the outside of the roller to secure the said shaft to the roller, a bearing ring secured to the said roller at the end and having a tapered edge to enter the inside of the drum when the roller is thrust longitudinally by the shaft at the other end, packing interposed between the said ring and the drum, surrounding the shaft, and means to rotate the roller and the drum at the same and different speeds.

5. In a device of the class described, the combination with a rotatable drum, of a working roller rotatable therein, a gear wheel attached to the drum, a shaft secured to the roller extending through the gear wheel and having no direct driving connection with it, a knuckle clutch pinion secured to the shaft and adapted to be moved into and out of engagement with the said gear wheel, a counter-shaft having one gear wheel meshing with the drum gear wheel and another gear wheel adapted to mesh with said pinion when it is out of engagement with the drum gear wheel, and means to rotate the shafts, the rotation thereof when the clutch pinion is in engagement with the drum gear being effective to rotate the drum and the roller at the same speed in the same direction and to rotate the drum and roller at different speeds in the same direction when the clutch pinion is in engagement with the gear wheel on the countershaft.

6. In a device of the class described, the combination with a rotatable drum, of a working roller rotatable therein, a gear wheel secured to the drum and having a central sleeve portion, a shaft secured to the roller and freely rotatable in the sleeve, a knuckle clutch pinion secured to the shaft movable longitudinally thereof and adapted to engage the said sleeve at the end, a counter-shaft provided with a small gear wheel meshing with the drum gear wheel and a large gear wheel adapted to mesh with the pinion, a latch to lock the pinion in engagement with the said sleeve or meshing with the large gear wheel, and means at the end of each shaft to secure a shaft rotating device thereto, the rotation of the shaft being operative to rotate the drum and the roller at the same speed and the roller at a faster speed than the drum in accordance with the position of the said clutch pinion.

7. In a butter making machine, the combination with a rotatable drum, of a butter working roller rotatable therein, a cradle removably positioned in the drum and locked in the ends thereof, the said cradle being operative to pick up the butter material as the drum rotates and deposit it over the roller, and means to rotate the drum.

8. In a butter making machine, the combination with a rotatable drum, of a butter working roller rotatable therein, an adjustable cradle removably positioned in the drum and locked in the ends thereof, the said cradle being operative to pick up the butter material as the drum rotates and deposit it over the roller, flights arranged about the inside surface of the drum to assist the cradle in raising and agitating the butter material, and means to rotate the drum.

9. In a butter making machine, the combination with a rotatable drum, of a butter working roller rotatable therein having ribs to deflect the butter material longitudinally, a series of flights arranged about the inside of the drum and adapted to raise and agitate the butter material, a cradle positioned in the drum and operative to direct the butter material upon the roller, and means to rotate the drum.

10. In a butter making machine, the combination with a rotatable drum, of a butter working roller rotatable therein, means for agitating the butter material and for directing it against the roller, a butter working shelf removably positioned in the drum and provided with bars longitudinally movable, the inside ends of the drum being formed with openings to receive the bars, the openings being spaced apart and arranged so that the shelf may be adjusted at an angle with respect to the roller and at various distances therefrom, and means to rotate the drum and the roller.

11. In a device of the class described, the combination with a rotatable drum having a segment thereof removed to form a door opening extending the whole length of the drum, a door therefor with an outer surface of the same curvature as the drum and having an inner plane surface to fit the drum opening, and means to bind the door removably in position.

12. In a butter making machine the combination with a drum formed with a segment thereof omitted for a door opening, binding hoops for the drum having flattened portions to fit the door opening portion, a door therefor having a surface to fit the door opening, and means removably to secure the door in position.

13. In a butter making machine the combination with a drum having an opening in the surface thereof forming a plane surface, of a door therefor, hoops for the drum formed with a flat portion to fit the said surface, means to tighten the hoops, the said door being formed with grooves around its contacting surface, packing material positioned therein to prevent leakage, and means to clamp the door in position.

14. In a butter making machine, the combination with a rotatable drum having a door opening which presents a plane surface, of a door therefor adapted to fit the plane surface, a cradle for agitating and directing the butter material in the drum when it rotates having one end arranged in proximity to the door opening, means without the drum for clamping it in any desired position, the said cradle being adapted to hold the butter in its completed condition, hinges and locking devices for the door whereby the door may be opened and positioned to form a removal tray for the butter from the cradle, the drum being locked in position by the said clamping means.

15. In a butter making machine of the class described, the combination with a circular drum having a segment thereof removed to form a plane door opening, a door therefor with a plane surface to fit the opening and a circular outer surface to conform with the drum surface, hoops at the side of the door surrounding the drum with flattened portion adjacent the door, fastening plates for the door secured to the drum, the end of the said plates being adapted to enter the hinge member to form a hinge fastening for the door, and the other end being positioned under the clamp and engaged thereby to bind the door in position.

16. In a butter making machine, the combination with a rotatable drum, of a butter working roll rotatably mounted therein, the drum being provided with an opening in the outer face thereof and presenting a plane door jamb, a door therefor removably hinged at one edge thereof, a cradle for agitating and directing the butter material in the drum and against the roller and positioned with one edge adjacent the hinged edge, at one side of the roller, a butter working shelf adjustably and removably positioned at the other side of the roller, means to rotate the drum and the roller at the same and at different speeds, and in the same direction, means for selecting the speeds at which said members are relatively rotated, the drum being provided with an outlet opening beneath the said cradle and a faucet therefor, the drum and the roller being rotated at the same rate to agitate and separate the butter fat from the butter fluid in the drum, a device for locking the drum to the drum support in any desired position, the roller being rotated more rapidly than the drum to work the butter, and the said door being positioned adjacent the cradle to receive the butter when it is taken from the cradle.

17. A combined churn and butter worker, comprising a horizontally pivoted drum, a working roller rotatably mounted therein, being supported at one end by an adjustable pivot bearing wholly within the drum, said pivot bearing being adjustable from the exterior of the drum, a shaft journaled in the walls of the drum and being secured to the roller to rotate the same from the exterior of the drum, and means for causing the said adjustable bearing of the roller to press the roller longitudinally in the drum to form a fluid tight joint about the said shaft imparting rotation to the roller.

18. In a device of the class described, the combination with a drum of a working roller pivotally mounted therein, having vanes upon its surface adapted to cause the butter material in the device to be axially deflected in one direction part of the time and in the opposite direction during the remainder of the time while the roller is rotated continuously in the same direction.

19. In a device of the class described, the combination with a drum of a working roller in the interior of the drum, having vanes upon its surface adapted to cause material within the drum to be deflected axially of the roller in one direction during substantially one-half of the rotation and in the other direction the remainder of the rotation.

20. A combined churn and butter worker, comprising a horizontally pivoted drum and working roller rotatably journaled therein, there being a longitudinally adjustable shaft extending through the walls of the drum at one end of the roller to furnish a bearing therefor and to press the roller against the other end, and a shaft rotatably mounted in the wall of the drum at the opposite extremity of said roller, and being secured to the roller in the interior of the drum and adapted to rotate the same, and means for imparting rotation to the last said shaft from the exterior of the drum.

21. In a combined churn and butter worker the combination with a rotatable drum of a butter working roller pivotally mounted therein, a shaft for operating said roller extending through the wall of the drum to the exterior thereof, a gear secured to said shaft, a counter shaft being provided with a gear in mesh with the gear on said shaft, and a second gear secured to said counter-shaft in mesh with a gear on said drum for rotating same, means for shifting the gear on the shaft of the drum, and a detachable hand lever fitting both the roller shaft and the counter shaft for rotating either one at will.

22. In a device of the class described, the combination with a rotatable drum, a working roller rotatably mounted therein, a shaft extending through one wall of the drum from the exterior to the interior thereof, and being screw threaded for adjustment in relation to said wall of the drum, the said shaft furnishing on the interior of the drum a bearing for one end of the working roller, a shaft secured to the working roller at its opposite end adjacent the opposite wall of the drum, a fluid tight bearing around said first named shaft adjacent the drum wall, whereby both the roller and the last said shaft may be pressed longitudinally to cause the end of the shaft to bind against the drum wall to form a liquid tight joint.

23. In a device of the class described, the combination with a drum having a segment the full length of the drum omitted to form a door opening, and a door therefor with an outer surface of the same curvature as the drum, and with ribs at the ends of the shape of the omitted segment, whereby a substantially flat or plane surface is formed to fit the flattened portion of the drum.

24. In a device of the class described, the combination with a circular drum having a segment the length of the drum omitted to form a door opening, and a door therefor with an outer surface of the same curvature as the drum and having ribs at the ends to fill out the segment and forming a receptacle when the door is inverted.

25. In a device of the class described, the combination with a rotatable drum, of a butter working roller rotatably mounted therein, the said roller comprising a member rectangular in cross section, and vanes disposed at angles to the faces thereof to direct the material longitudinally of the roller as it is rotated, and means to rotate the drum and the roller.

26. In a device of the class described, the combination with a rotatable drum, of a butter working roller rotatably mounted therein, the said roller comprising a member rectangular in cross section, and vanes disposed at angles to the faces of the member in one direction on substantially half of the surfaces and at angles to the faces in the other direction on the other surfaces to direct the material to be worked in opposite directions as the roller is rotated.

27. A combined churn and butter worker, comprising a horizontally pivoted drum and a working roller rotatably journaled therein, and a cradle comprising a plurality of strips extending longitudinally between the walls of the drum and arranged to form a concave upper surface with one edge adjacent the periphery of the butter working roller and extending to the inner edge of the drum a point angularly in advance of the periphery of the roller whereby the material to be worked will be deflected against the roller when the drum is rotated, and means to rotate the drum and the roller.

28. In a device of the class described, a rotatable drum having a segment removed therefrom the entire length of the drum to form a door opening.

29. In a device of the class described, a rotatable drum having a segment removed therefrom the entire length of the drum with the outer edges disposed in the same plane to constitute a flat door casing.

30. In a device of the class described, the combination of a rotatable drum having a segment removed therefrom the entire length of the drum with the outer edges disposed in the same plane to constitute a flat door opening, and a door for said opening extending the full length of the drum.

In testimony whereof I have signed my name to this specification, in the presence of two subscribing witnesses, on this 29th day of August A. D. 1911.

PAUL HANSON.

Witnesses:
A. L. SPRINKLE,
C. H. SEEM.

Copies of this patent may be obtained for five cents each, by addressing the "Commissioner of Patents, Washington, D. C."